(12) United States Patent
Andrus

(10) Patent No.: US 7,367,513 B2
(45) Date of Patent: May 6, 2008

(54) INTELLIGENT COMPUTER CABLING

(75) Inventor: Paul L. Andrus, McKinney, TX (US)

(73) Assignee: Data Drive Thru, Inc., McKinney, TX (US)

( * ) Notice: Subject to any disclaimer, the term of this patent is extended or adjusted under 35 U.S.C. 154(b) by 0 days.

(21) Appl. No.: 11/462,632

(22) Filed: Aug. 4, 2006

(65) Prior Publication Data

US 2007/0023529 A1    Feb. 1, 2007

(51) Int. Cl.
*G06K 19/06*    (2006.01)

(52) U.S. Cl. .................. 235/492; 235/487; 235/441

(58) Field of Classification Search ............... 235/492, 235/487, 441, 486; 709/227, 250, 72; 710/72, 710/100

See application file for complete search history.

(56) References Cited

U.S. PATENT DOCUMENTS 7,108,191 B2 * 9/2006 Andrus ................ 235/492

* cited by examiner

*Primary Examiner*—Karl D. Frech
(74) *Attorney, Agent, or Firm*—David W. Carstens; Carstens & Cahoon, LLP

(57) ABSTRACT

The present invention provides a data transfer system apparatus that automatically loads the necessary drivers and code through two interface elements to facilitate the transfer of electronic data from one EDP to another. In a preferred embodiment of the present invention the apparatus consists of a cable, USB interface plug, floppy drive transfer device (diskette), processor, controller, memory, circuitry components and software code. The electronic components and software applications are contained in the cable housing unit. Each interface element is attached at one end of the cable so they can be inserted into the respective EDP interfaces. Insertion of the apparatus into the EDP interfaces automatically triggers the execution of the embedded software for auto loading of the necessary code to control the transfer of the data directly from one EDP to the other. The system emulates the apparatus as a peripheral device attached to the EDP through its USB port interface coupled to the other EDP using its FDD to transfer the data, using the data storage capacity of the receiving EDP as the serial bus end-point.

15 Claims, 9 Drawing Sheets

INTELLIGENT COMPUTER CABLING

CROSS-REFERENCE TO RELATED APPLICATIONS

This application claims the benefit of and priority to U.S. patent application Ser. No. 10/968,056 filed Oct. 19, 2004 the technical disclosures of which are hereby incorporated herein by reference.

TECHNICAL FIELD

The invention relates generally to the field of data transfer devices, which create a data link between two electronic data processing (EDPs) machines or devices using standard EDP interfaces. More specifically, the invention describes a cable based data transfer system with embedded code to automate the process of moving the data from one EDP to another using standard EDP connectivity interfaces.

BACKGROUND OF THE INVENTION

There are numerous methods of transferring data from one electronic data processing machine (EDP) to another, including copying data to floppy disks, compact disks (CD), flash memory sticks or external data storage devices. There are also software programs and devices available to manage the data transfer using a cable or wireless connection using a standard parallel port, serial port, USB, PCMCI or other network (Ethernet or telephony) interface. These methods require the creation and management of a network.

Almost all of the above methods require manual installation and configuration of the device or the program managing the data transfer, except for the copy function of data to or from a data storage disk using a standard EDP read/write device such as a floppy disk drive (FDD).

The drawback with current cable and wireless methods is that the expertise required to install and configure the device and the related software application to manage the device and execute the desired data transfer is far beyond the expertise of the average computer user. In particular, these prior art data transfer systems lack a process to automate the loading, execution and configuration of the necessary code to facilitate the data transfer between two EDPs.

Therefore, it would be desirable to have an apparatus that automatically loads the drivers and code necessary to facilitate the transfer of data between EDP using standard EDP connectivity interfaces.

SUMMARY OF THE INVENTION

The present invention provides a data transfer system apparatus that automatically loads the necessary drivers and code through two interface elements to facilitate the transfer of electronic data from one EDP to another. In a preferred embodiment of the present invention the apparatus consists of a cable, USB interface plug, FDD transfer device (diskette), processor, controller, memory, circuitry components and software code. The electronic components and software applications are contained in the cable housing unit. Each interface element is attached at one end of the cable so they can be inserted into the respective EDP interfaces. Insertion of the apparatus into the EDP interfaces automatically triggers the execution of the embedded software for auto loading of the necessary code to control the transfer of the data directly from one EDP to the other. The system emulates the apparatus as a peripheral device attached to the EDP through its USB port interface coupled to the other EDP using its FDD to transfer the data, using the data storage capacity of the receiving EDP as the serial bus end-point.

The invention provides an apparatus with an embedded system, which uses flash memory to automate code loading and file execution. This method replaces current data transfer methods between two EDPs that require three separate physical components of cable, software and a peripheral device (or device emulation). The manual loading of software onto each EDP is eliminated by using programmable memory arrays (flash memory) and by using the power source provided by the USB port on one EDP to supply current to the processor(s) and memory.

The present invention allows for a reduction in the steps required to use a cable based data transfer system. Utilization of the FDD allows data transfer to or from EDPs that do not have USB ports, which is helpful when transferring data files from older EDPs. The present invention also eliminates the complexity of manual software application loads and configuration, which provides a low cost data transfer system that can be used by the average non-expert user. Because of the current supplied by the USB port, there is no requirement for an external power source, internal batteries or internal current generator, further reducing the cost of using the invention. Furthermore, the present invention is operating system (OS) agnostic, and the data transfer volumes are limited only by the available data storage capacity of the EDP receiving the transferred data.

The functional result of the apparatus use is an easy-to-use true "plug and play" data transfer system through the emulation of the target EDP as a peripheral storage device connected to the source EDP.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
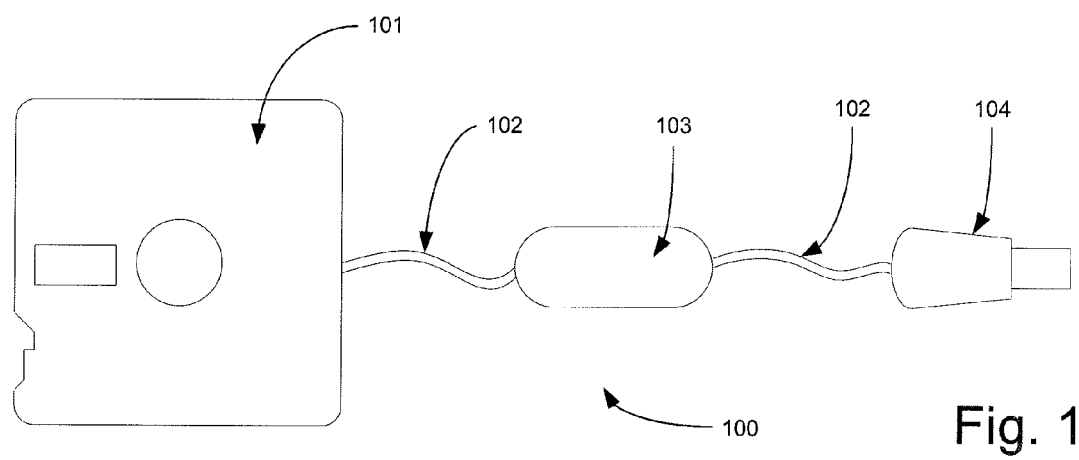
FIG. 1 depicts a 3.5" FDD compatible diskette in accordance with the present invention.

The present invention provides a cable based data transfer apparatus that contains embedded electronics using flash memory to automatically load the drivers and code to facilitate the transfer of data utilizing standard electronic data processing (EDP) connectivity interfaces.

Universal serial bus (USB) interfaces are becoming the de facto interface standard for connectivity to peripheral devices and is currently included in the manufacturing of new EDPs. USB specifications provide built-in functionality to make peripheral expansion more user friendly as well as providing a single cable model for connectivity to an EDP. These features include self-identification of USB compliant peripherals, auto mapping of functions to a driver and enabling a peripheral device to be dynamically attachable and re-configurable. The USB specification also includes a data flow model, which provides the architecture to manage data transfer from a host platform to an end-point on a device (pipe). The USB Specification provides requirements for the electrical and physical connection between the peripheral device and the host using the bus. An important feature of the USB interface is that it provides up to 500 milliamps of electrical power at 5 volts and signals very fast at 480 Mb/s for high speed USB devices compared to 115 kbits/s for serial and parallel port interfaces.

For the transfer of data from one EDP to another using the USB specification, cables are typically used as the transport medium between a standard USB port on an EDP (connector type A) and a USB compatible peripheral device (connector type B) or another USB port on another EDP. Using the USB specification to transfer data from one EDP to another requires the creation or emulation of a peripheral type device to utilize the embedded USB functionality. This is typically accomplished by loading and configuring a software application that in turn loads the appropriate drivers and provides the necessary code to create the USB end-point and manage what has become a cable based peripheral. This process normally involves loading a compact disk in the CD drive and loading and configuring the necessary application and/or code, which requires considerable expertise on the user's part. Like USB, IEEE-1394 is an external bus standard that uses twisted pair wiring to move data. It also supplies an electric current along with support for Plug-and-play or "hot plugging" with compatible peripheral devices. The basic feature/functionality sought in the development of this standard is the same as USB, mainly to replace the myriad of I/O connectors employed by consumer electronics equipment and personal computers. Like USB, it supports the concept of an isochronous device, a device that needs a certain amount of bandwidth for streaming data. IEEE-1394 is considered a high performance serial bus in that it supports data transfer rates substantially higher than current USB specifications. It has two forms, 1394a and 1394b with the later supporting transfer rates of 800 Mbps, twice that of 1394a.

IEEE-1394 is a layered transport system. The current standard defines three layers: Physical, Link and Transaction. The Physical layer provides the signals required by the IEEE-1394 bus. The Link layer takes the raw data from the Physical layer and formats it into recognizable 1394 packets. The Transaction layer takes the packets from the Link layer and presents them to the application.

Because of its high data transfer rates and multiplexing capabilities of a variety of different types of digital signals, IEEE-1394 is being adopted as the de facto standard for the transfer of large data volumes, particularly those devices that require real-time transfer of high levels of data such as compressed video and digitized audio. IEEE-1394 interfaces are beginning to be included in the manufacturing of personal EDP machines.

Floppy disk drives (FDDs) have been included in the manufacturing of most EDPs to date. The current standard for an EDP is an FDD that utilizes a 3.5" floppy magnetic disk. The important feature of a standard FDD relative to this invention is the read/write head, which is used to convert binary data to electromagnetic pulses when writing to the disk, and the reverse when reading from the disk. However, FDDs are being phased out as part of the normal technology life cycle for computer disk drives due to the adoption of the compact disk (CD) and digital versatile disk (DVD).

FDDs are typically used for loading new software applications onto to the memory of the EDP or for extracting data to a floppy disk for storage or data transfer. FDDs are also typically used to create "boot disks" for the EDP's operating system. One of the major drawbacks of FDDs leading to its obsolescence is the limitation of the amount of data that can be stored on a standard floppy disk as well as the slow transfer rates.

Elements exist that can interface with the standard read/write heads of most FDDs using a smart-diskette. This creates a physical transfer interface using a basic magnetic transducer that is essentially a simple antenna-based transmitter and receiver of the electromagnetic pulses created by the FDD's read/write heads. However, these elements lack an automated process and transfer medium for transferring data from one EDP to another. Such smart-diskette based technologies are primarily used to provide an interface for smart cards (e.g., medical patient smart-cards and various peripheral memory cards) to the host EDP through the FDD read/write head mechanism. There are also a number of other drawbacks to current smart-diskette technologies including the requirement for a voltage generator and/or batteries to provide the necessary electrical current to run the necessary processors and controllers and the lack of an interface to any of the current standard EDP interfaces including the USB specification. Other disadvantages include the requirement for loading and configuring a software application prior to usage and the lack of an automated method to self-discover a peripheral plugged into a smart-diskette interface or plug.

Flash-memory using programmable gate array based memory modules is a relatively new type of solid-state technology. This type of electronic non-volatile memory chip can also be erasable. Inside the flash memory chip is a grid of columns and rows, with a two-transistor cell at each intersecting point on the grid. A thin oxide layer separates the two transistors. One of the transistors is known as the floating gate, and the other one is the control gate. The electrons in the cells of a flash-memory chip can be manipulated by the application of an electric field, a higher-voltage charge. Flash-memory uses in-circuit wiring to apply this electric field either to the entire chip or to predetermined sections known as blocks. These blocks can be programmed or erased and re-written. Flash memory works much faster than traditional electrically erasable programmable read-only memory (EEPROM) chips because instead of erasing one byte at a time, flash memory erases a block or the entire chip.

Peripheral devices containing flash memory modules have the advantage of being relatively inexpensive and require relatively little power as compared to traditional magnetic storage disks. Most devices containing flash memory connect to the host EDP using one of the standard EDP interfaces (e.g., USB, PCMCIA, etc.) and then use the low cost chips to either provide a self-contained data storage medium or send a driver to the host EDP and rely on a separately loaded software application to manage the device.

With reference now to the figures, FIG. 1 depicts a 3.5" FDD compatible diskette in accordance with the present invention. In this embodiment of the invention, the data transfer apparatus 100 comprises a 3.5" FDD compatible diskette 101 containing electronic components connected to a twisted pair cable 102 that is in turn connected to a cable housing unit 103. The cable housing unit 103 contains additional electronic components mounted on a solid-state board/card and is connected by the twisted pair cable 102 to a USB type A plug 104.

Figure 2:
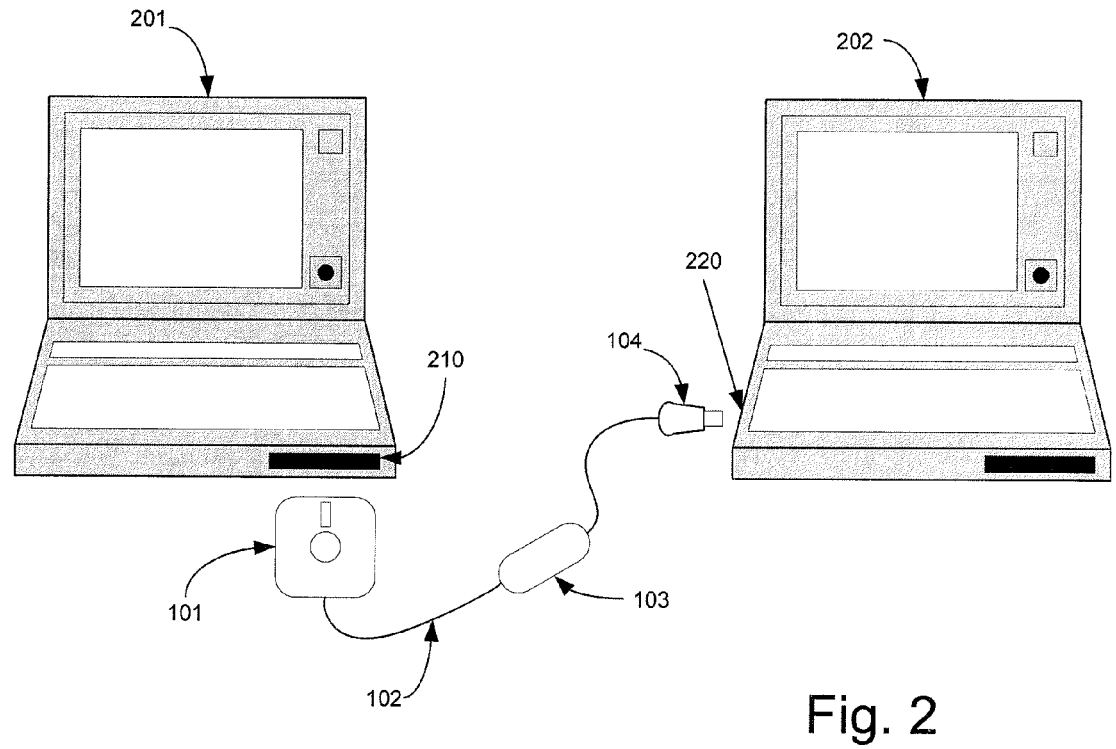
FIG. 2 shows two EDPs connected with a FDD compatible diskette assembly.

FIG. 2 shows two EDPs connected by a FDD compatible diskette assembly. The diskette 101 is inserted into the 3.5" FDD 210 of the first EDP 201, and the USB plug 104 is inserted into the USB port interface 220 of the second EDP 202. The USB interface, through existing USB specifications and functionality provided with EDP 202, provides an electrical current to the apparatus 100. Electrical current is also provided by the twisted pair cable 102 to the diskette 101 to power its electronic components.

When the data transfer apparatus 100 is plugged into the port interface 220 in the second EDP 202, USB interfaces auto-generate a request signal from the EDP 202. The processor and flash memory contained in the cable housing unit 103 answers the request from the EDP 202 with a reply that loads the necessary driver(s) and identifies the apparatus 100 as a peripheral storage type device and displays a drive letter and identifier in the EDP operating system's (OS) user interface. The processor in the cable-housing unit 103 then sends a storage file folder to the OS file structure and displays it in the user interface of the OS of EDP 202.

Simultaneous to the auto-loading of driver(s) and code to EDP 202, the processor and flash memory in cable housing unit 103 signals the controller 303 in the diskette 101 (shown in FIG. 4) to initiate the auto load process of drive selection, head alignment to track 00, and setting of the transfer rate with the FDD 210 of the first EDP 201. The processor in the cable housing unit 103 then sends a storage file folder to the OS file structure of EDP 201 through the twisted pair cable 102 and the electronic components in the diskette 101 and displays the file in the OS user interface of EDP 201.

The transfer of data from the first EDP 201 to the second EDP 202 is accomplished by simply copying the desired data to the appropriate FDD drive letter (usually Drive A:) through the default OS user interface resident on EDP 201. The data flow is regulated by the FDD 210 internal to EDP 201 and controller 303 in diskette 101 to move through the twisted pair cable 102 into the electronic components in cable housing unit 103 and then through twisted pair cable 102 and USB plug 104 into USB port interface 220 in EDP 202. The USB controller in housing unit 103 manages the flow of the data to EDP 202, directing it to the loaded file folder.

Transfer rates are dependent on the form implemented including the length and quality of twisted pair cable 102, its insulation/sheathing qualities, processing speeds of EDP internal processing chips, electrical current strength from USB port 220, as well as electronic component configurations and module types in cable housing unit 103 and diskette 101.

Figure 3A:
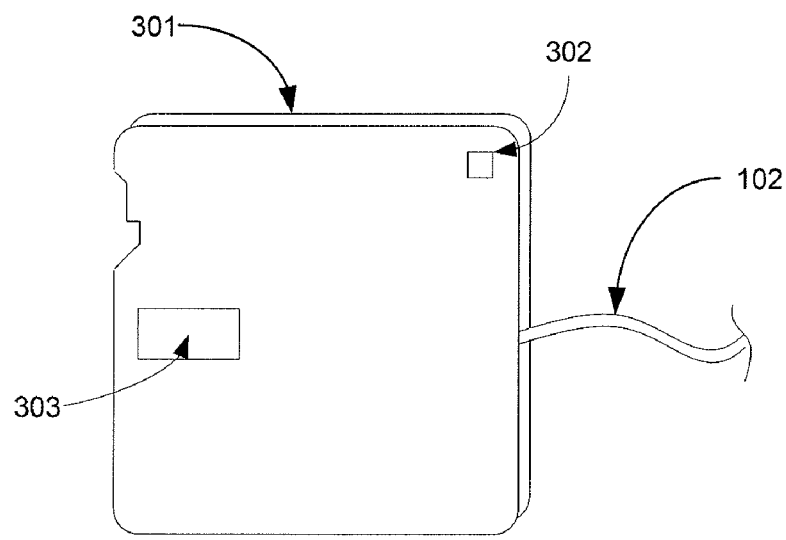
FIG. 3A shows the top side of the FDD diskette interface in accordance with the present invention.

With reference now to FIG. 3A, the top side of the diskette 101 is depicted in accordance with the present invention. The diskette 101 is comprised of an outer casing 301 protecting the electronic components and wiring, which are contained inside the diskette and mounted on a solid-state circuit-type card wired to the twisted pair cable 102. The diskette 101 is approximately the same width (maybe slightly wider) and length of a standard 3.5" floppy disk. The positioning of the attachment of twisted pair cable 102 can vary depending on the form of the configuration of the inner electronic components and wiring of the inside circuitry board of the diskette.

The write-protect window 302 is the same size and shape and in the same position as write-protect windows found on standard 3.5" floppy disks. The write-protect window 302 is in the open position and contains no moving window or slider so that the diskette emulates a write-ready floppy disk.

Figure 3B:
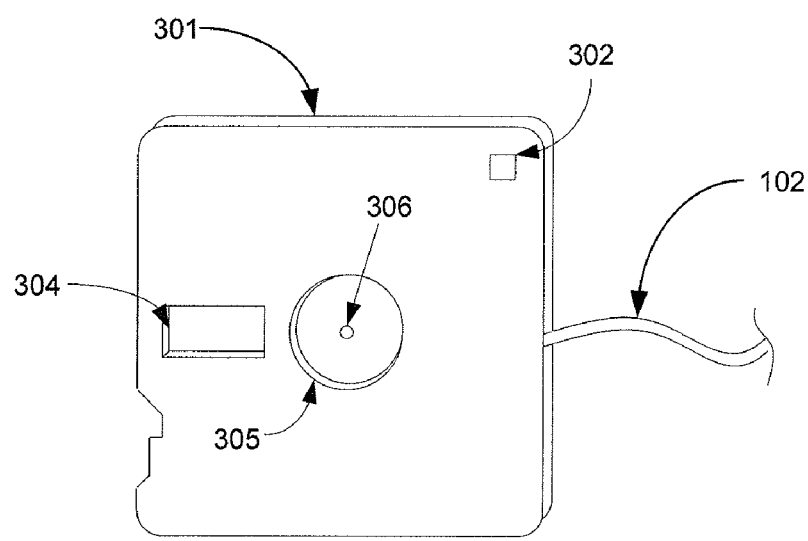
FIG. 3B shows the bottom side of the FDD diskette.

The outer casing 301 of diskette 101 also has a cutout 303 on the top of the diskette exposing the inside of the diskette casing. Cutout 303 provides an area where the top read/write head rests while the diskette 101 is in the inserted position inside the FDD. FIG. 3B depicts the bottom side of the diskette. A recess 304 accommodates and aligns the bottom read/write head of the FDD. In the center of the diskette 101 there is a circular recess 305 where the drive for a magnetic floppy disk would normally be, with another smaller and deeper circular recess 306 in the center to accommodate the drive spindle of the FDD. The positioning, shape and size of recesses 305, 306 is the same as found on standard 3.5" floppy disks.

Figure 4:
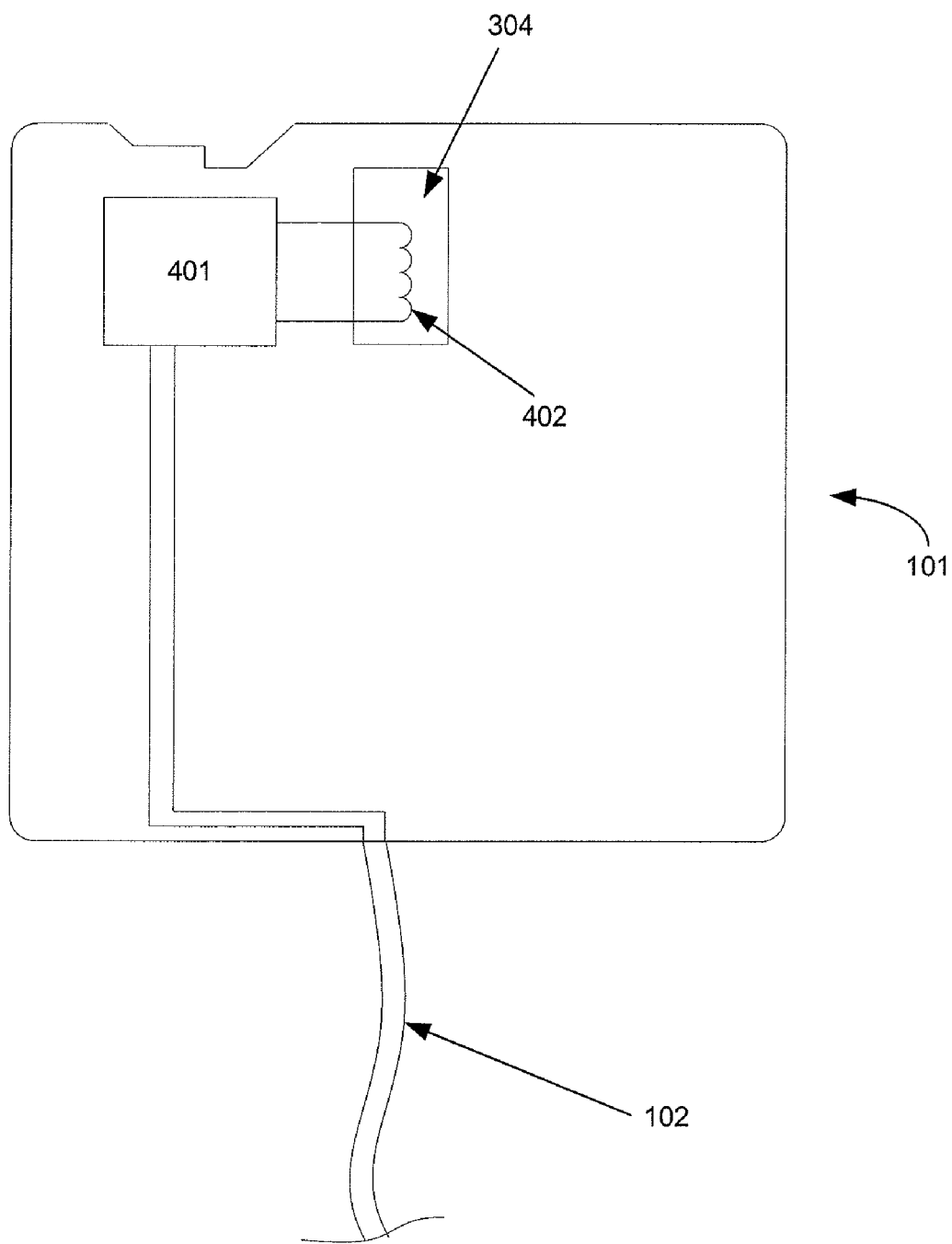
FIG. 4 shows an example configuration of the inside of the FDD diskette.

FIG. 4 shows an example configuration of the inside of diskette 101 in accordance with the present invention. Twisted pair cable 102 is wired to a circuitry-type board, which connects the twisted pair wires to the controller 401. Controller 401 manages the data flow to and from the cable housing unit through twisted pair wires 102. The controller 401 also controls data flow to and from the FDD by means of an electrically connected magnetic transducer 402 that receives and sends the signal pulses to and from the read/write head of the FDD. The read/write head sits in recess 304 to align the head on the diskette 101 so that an emulation of a 3.5" floppy disk set at track 00 can be accomplished using the magnetic transducer 402 as an antenna-type receiver/transmitter of the electromagnetic pulse signals.

Figure 5:
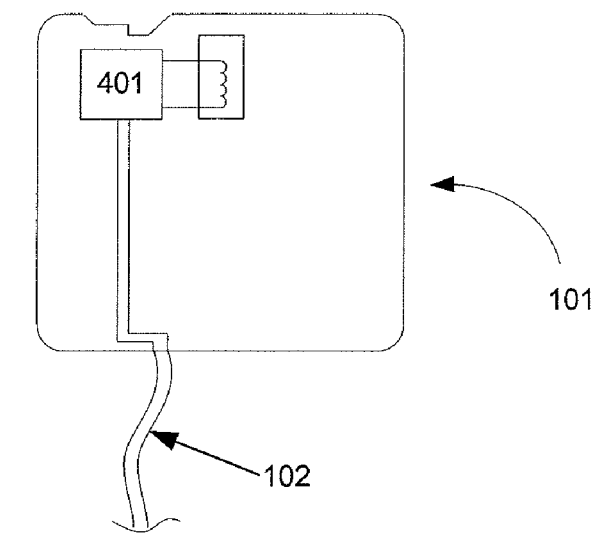
FIG. 5 show the architecture of the cable-housing unit connected to the diskette at one end and a standard USB plug type A on the other end.
Figure 5:
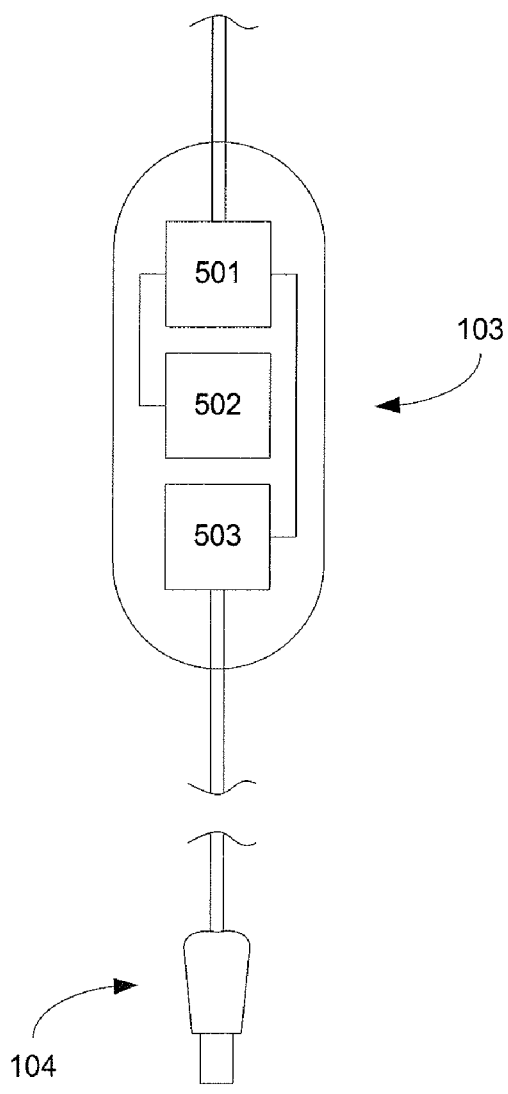

FIG. 5 shows the architecture of the cable-housing unit connected to the diskette at one end and a standard USB plug type A on the other end. The cable-housing unit 103 contains a solid-state circuit-type board/card configuration holding a microprocessor 501, memory (flash-type) 502 and a USB controller 503 along with wiring connecting the board and electrical components to the twisted pair cable 102. Processor 501 is connected to the circuitry-type board allowing it to send and receive signals to and from the diskette controller 401 and USB controller 503 as well as receive electrical current from the USB port interface on the EDP. The flash memory 502 module is a floating gate array type module containing all the code necessary to perform the execution of the application loads and driver installations upon system initialization when the apparatus is inserted into the first and second EDPs. The USB controller 503 manages the data flow and interaction with the second EDP using standard USB specifications and functionality, as described above.

Figure 6:
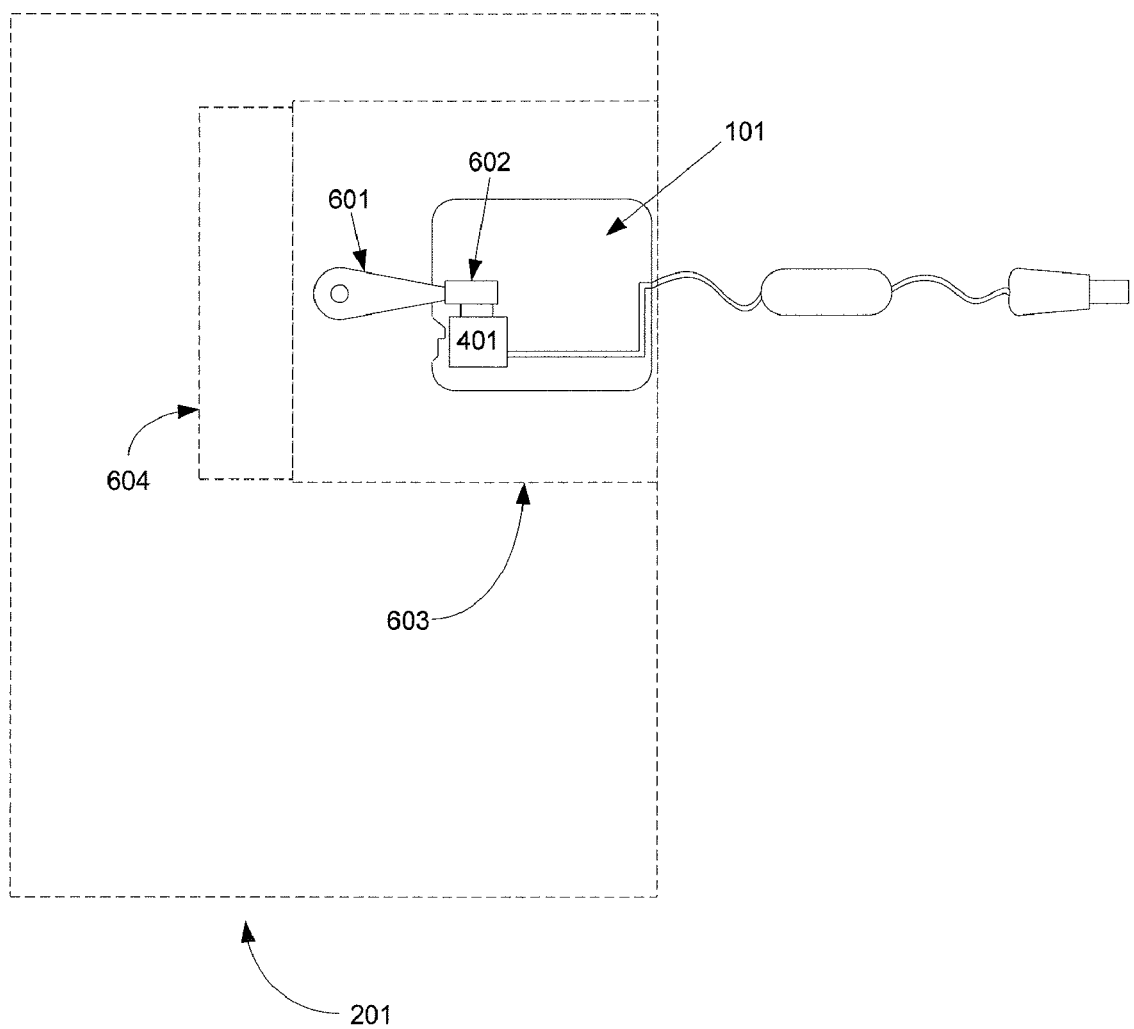
FIG. 6 shows the diskette of the present invention inserted into an EDP 201 through a standard 3.5" FDD external interface.

FIG. 6 shows the diskette 101 of the present invention inserted into an EDP 201 through a standard 3.5" FDD external interface. The internal interface is depicted by showing diskette 101 in the inserted position and the FDD top arm assembly 601 holding read/write head 602 resting in recess of the diskette. Internal control of the FDD 603 is provided by the disk controller 604, which manages the data transfer internally between the FDD 603 and the internal processor and memory components of the EDP 201. These components are found with most all FDD devices.

Figure 7:
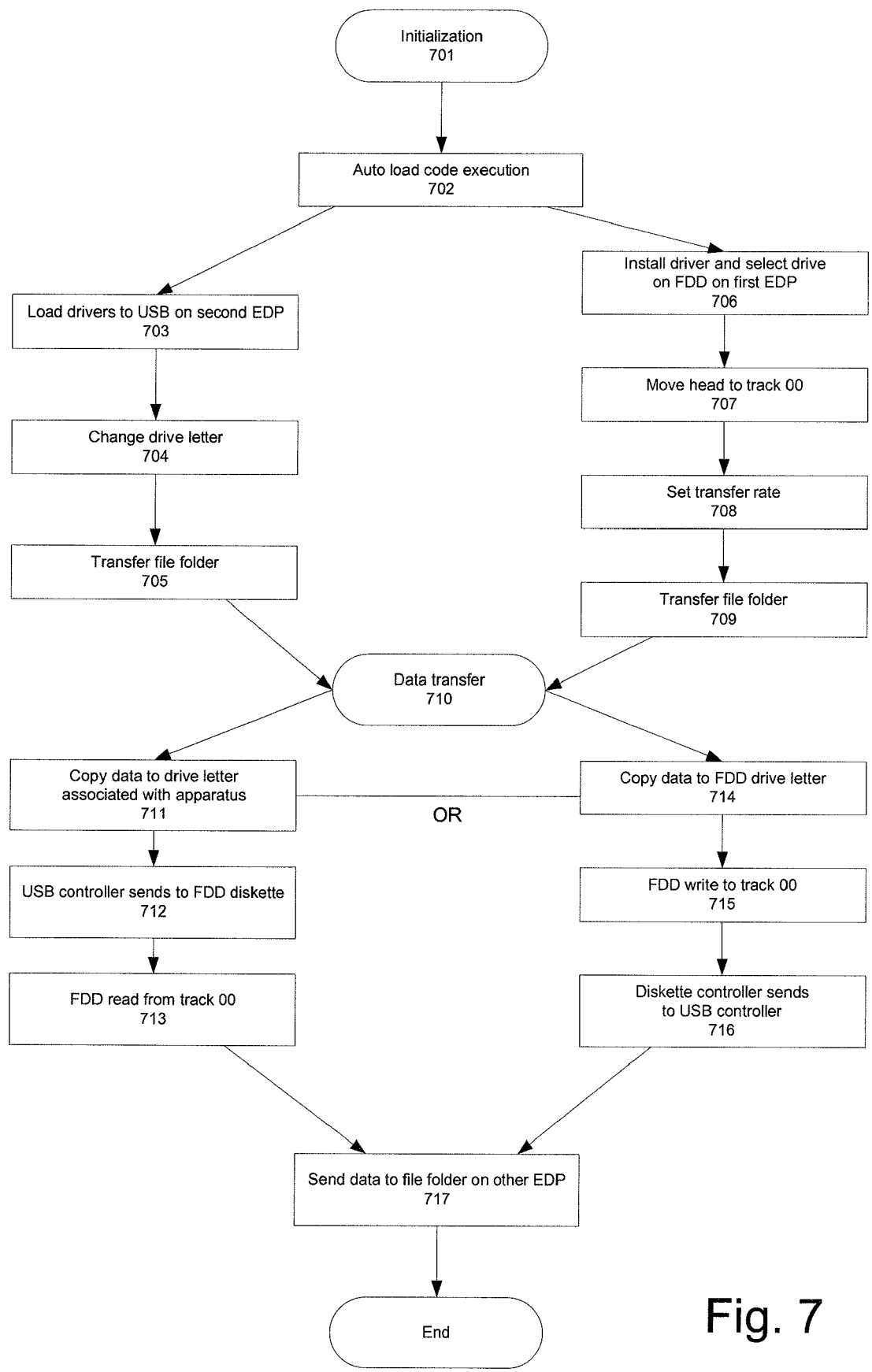
FIG. 7 is a general flowchart of the auto-load process of the first embodiment of the present invention.

FIG. 7 is a general flowchart of the auto-load process of the present invention. The process is achieved by executing software code embedded in the memory of the apparatus contained in cable housing unit. The process begins with insertion of the diskette into the FDD interface of the first EDP and insertion of the USB plug into the USB port interface of the second EDP, which activates the initialization of the auto load process (step 701). The USB port interface provides the electrical current to the apparatus to power the processor and other electronic components contained in the cable housing unit and diskette. Software code execution then launches two parallel processes of loading the necessary file(s), driver(s) and code to each EDP (step 702).

The first process stream begins by answering the request generated by the second EDP and sending a response and the necessary driver(s) identifying the apparatus as a peripheral device (step 703). The auto-loading of the driver(s) creates a drive letter displayed in the OS user interface of the EDP identifying the apparatus as a peripheral device (step 704). The apparatus then transfers a file folder to the file structure of the EDP OS and displays it as a file related to the data transfer system apparatus (step 705).

The second process stream begins by installing a driver on the first EDP and sending a signal to the FDD identifying the diskette as a drive, using the default OS identifier for the FDD (normally displayed as drive A: in most operating systems) (step 706). The apparatus then sends a signal to the FDD disk controller to move the read/write head to track 00 (step 707). The diskette controller accommodates the emulation of the diskette as a floppy disk with track 00. The data transfer rate is set in the same manner of sending a signal managed by the controller through the magnetic transducer to the read/write head of the FDD (step 708). The apparatus then auto transfers a file folder to the file structure of the first EDP OS and displays it as a file related to the data transfer system apparatus (step 709).

The data transfer process can now begin on each EDP by using the existing OS user interface of each machine to copy and move the files from one machine to another (step 710).

To copy data from the second EDP to the first, the user copies the data to the drive letter (i.e. A:) that identifies the drive as the apparatus (step 711). The copy procedure is the same procedure already used by the user to copy data and files from one location to another using the character based command line user interface or the graphical user interface (GUI) provided by the EDP's OS. When the copy function is completed, the USB controller sends the data to the cable-housing unit, which passes the data to diskette controller, and the diskette controller then sends the data as signals to the read/write head as an emulation of track 00 on a floppy disk (step 712). The FDD of the first EDP reads from track 00 (step 713) and sends the data to the file folder that was sent to the first EDP in step 709 earlier in the auto load process (step 717).

Transfer of data from the first EDP to the second is essentially the reverse of steps 711-713. The process begins by copying the desired data from the first EDP to the FDD drive letter (step 714). Again, the copy procedure is the same procedure typically used to copy data and files from one location to another. When the copy function is completed, the FDD disk controller writes the data to track 00 (step 715), which is then picked up by the magnetic transducer and sent by the diskette controller to the USB controller through the cable-housing unit (step 716). The data transfer process is completed by the USB controller sending the data through the USB port interface to the file folder on the second EDP (step 717).

In both copy processes, the users of the EDPs use the existing user interfaces of their respective machines provided by the operating systems. The default copy, move, and erase procedures are also followed to move the transferred data from the storage file folder placed in the EDPs' file structure in step 704 and 709 to the desired location on the EDPs. Using the present invention, the data volume that can be transferred from one EDP to another is limited only by the total available data storage capacity of the EDP receiving the transferred data.

In addition to the example embodiment described above employing 3.5" FDD and USB interfaces, the present invention may also be implemented with the IEEE-1394 standard. By incorporating the FDD, USB and IEEE-1394 interfaces, the present invention is capable of five alternate embodiments in addition to the one described above.

Figure 8A:
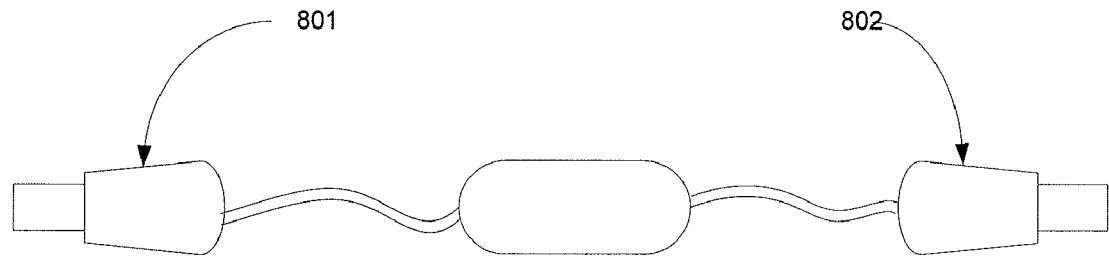
FIG. 8A shows an alternate embodiment of the present invention with USB plugs at both ends of the cable.

FIG. 8A shows an alternate embodiment of the present invention with USB plugs 801, 802 at both ends of the cable.

Figure 8B:
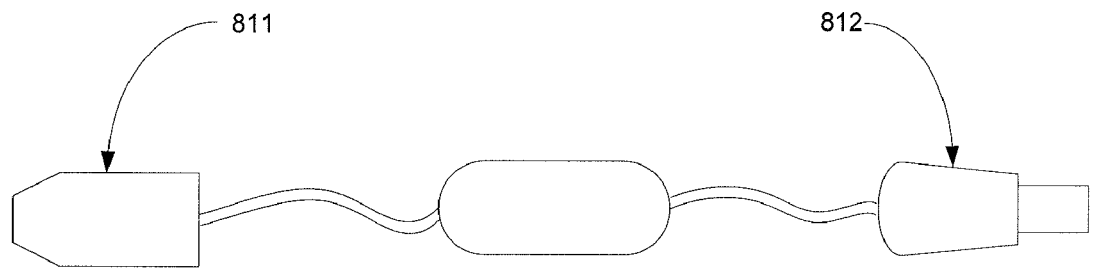
FIG. 8B shows an embodiment of the present invention with a USB plug at one end of the cable and an IEEE-1394 plug at the other end.

FIG. 8B shows an embodiment of the present invention with a USB plug 811 at one end of the cable and an IEEE-1394 plug 812 at the other end.

Figure 8C:
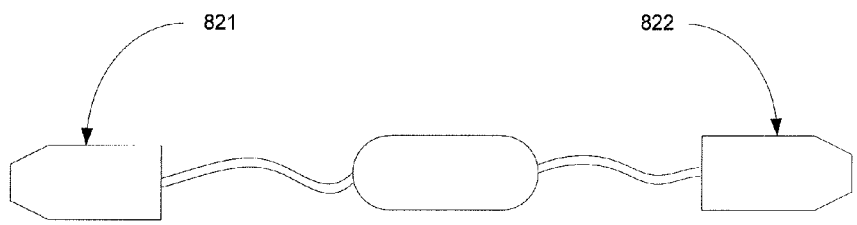
FIG. 8C shows an embodiment of the present invention with IEEE-1394 plugs at both ends of the cable.

FIG. 8C shows an embodiment of the present invention with IEEE-1394 plugs 821, 822 at both ends of the cable.

Figure 8D:
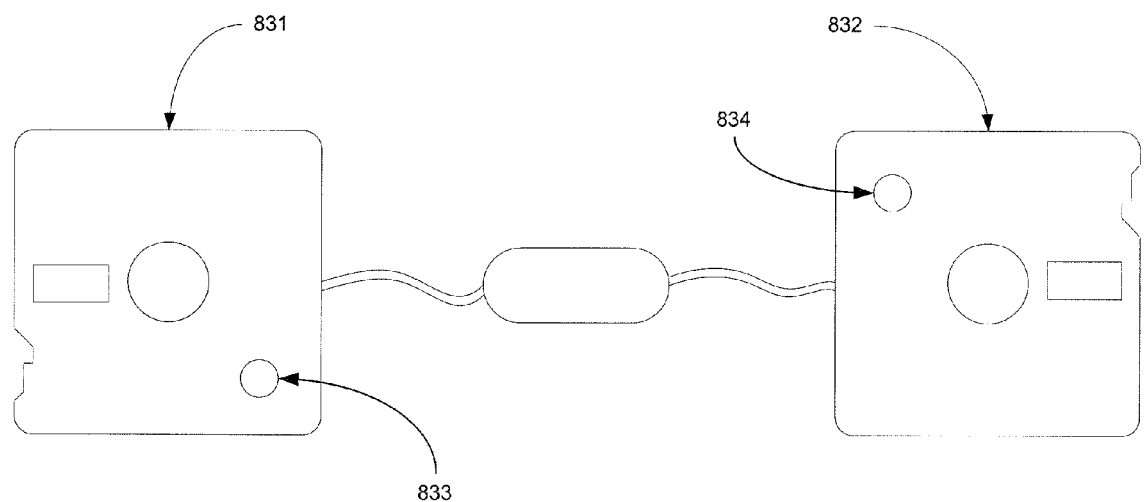
FIG. 8D shows an embodiment of the present invention with FDD interfaces at both ends of the cable.

FIG. 8D shows an embodiment of the present invention with FDD interfaces 831, 832 at both ends of the cable using a battery 833, 834 inserted into each diskette to provide the necessary current to power the controller.

Figure 8E:
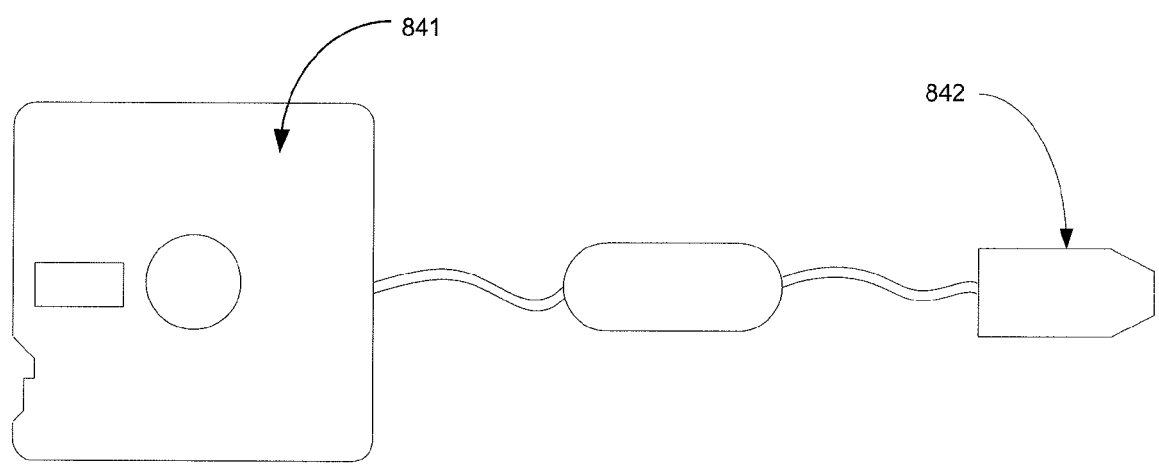
FIG. 8E shows an embodiment of the present invention with a FDD interface at one end of the cable and an IEEE-1394 plug at the other end.

FIG. 8E shows an embodiment of the present invention with a FDD interface 841 at one end of the cable and an IEEE-1394 plug 842 at the other end.

The USB and IEEE-1394 interfaces provide almost identical feature/functionality in terms of issuing and handling requests from a peripheral device. (The invention apparatus is emulating a peripheral storage device.) USB and IEEE-1394 specifications are managed by separate governing bodies but the way in which the invention sends and receives data using the cable-based system is the same. The embodiments that include an FDD interfaces are more complicated than the USB and IEEE-1394 ones in that additional electronics are required to transfer, manage and control the data through the read/write head of the FDD. However, because the additional electronics are contained inside the diskette unit itself a single cable-housing unit can be manufactured to support all six embodiments. In this way, only the interface plugs/devices at the end of the cable change, which significantly reduces the cost to manufacture multiple products that have the same end function and user experience.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. An apparatus for data transfer between two electronic data processing (EDP) devices, the apparatus comprising:
   (a) a cable housing;
   (b) a cable extending from two points of said cable housing;
   (c) a solid state board inside said cable housing, wherein the solid state board is wired to said cable;
   (d) a processor and memory chip mounted on said solid state board;
   (e) a first EDP interface at the first end of said cable; and
   (f) a second EDP interface at the second end of said cable;
   wherein, upon insertion of the first EDP interface into the first EDP device and insertion of the second EDP interface into the second EDP device, the apparatus automatically loads and executes drivers and additional software code stored in said memory chip onto said EDP devices, wherein said drivers and software code facilitates the direct transfer of data from one EDP device to the other EDP device; and
   wherein the apparatus automatically transfers a file folder to a pre-existing file structure on each EDP device and displays said file folder in user interfaces on the EDP devices.

2. The apparatus according to claim 1, further comprising a controller mounted on said solid state board.

3. The apparatus according to claim 1, wherein the memory chip is flash memory.

4. The apparatus according to claim 1, wherein the apparatus emulates a peripheral storage device.

5. The apparatus according to claim 1, wherein transfer of selected data between the EDP devices is performed using respective existing operating systems of each EDP device.

6. The apparatus according to claim 1, wherein the first EDP interface may be one of the following:
   a universal serial bus plug;
   an IEEE-1394 plug;
   a diskette compatible with a 3.5 inch floppy disk drive, wherein the diskette contains a controller on a circuitry board wired to said cable and a magnetic transducer connected to the controller that transfers data through the read/write head of the floppy disk drive.

7. The apparatus according to claim 1, wherein the second EDP interface may be one of the following:
   a universal serial bus plug;
   an IEEE-1394 plug;
   a diskette compatible with a 3.5 inch floppy disk drive, wherein the diskette contains a controller on a circuitry board wired to said cable and a magnetic transducer connected to the controller that transfers data through the read/write head of the floppy disk drive.

8. A method for transferring data between two electronic data processing (EDP) devices, the method comprising the steps of:
   (a) inserting a first EDP interface into the first ETDP device and inserting a second EDP interface into the second EDP, wherein the first and second EDP interfaces are connected by a cable that extends from two points of a cable housing, wherein said cable housing contains a solid state board wired to said cable, and wherein a processor and memory chip are mounted on said solid state board;
   (b) automatically loading and executing drivers and additional software code stored in said memory chip onto said first and second EDP devices upon insertion of the first EDP interface into the first EDP device and insertion of the second EDP interface into the second EDP device, wherein said drivers and software code facilitates the direct transfer of data from one EDP device to the other EDP device; and
   (c) automatically transferring a file folder to a pre-existing file structure on each EDP device and displaying said file folder in user interfaces on the EDP devices.

9. The method according to claim 8, wherein step (b) further comprises automatically selecting a drive on both the first EDP device and second EDP device, wherein said selected drives are used for sending and receiving data.

10. The method according to claim 8, wherein at least one of the first and second EDP interfaces transfers data through the read/write head of a 3.5 inch floppy disk drive.

11. The method according to claim 10, wherein the read/write heads is automatically set to read from track 00.

12. The method according to claim 8, wherein step (b) further comprises transferring a storage file from one EDP device to the file directory of a resident operating system in the other EDP device.

13. The method according to claim 8, wherein the transfer of data between the two EDP devices may be both unidirectional and bidirectional.

14. The method according to claim 8, wherein the device comprising the first and second EDP interfaces, cable, and cable housing emulates a peripheral storage device.

15. The method according to claim 8, wherein transfer of selected data between the EDP devices is performed using respective existing operating systems of each EDP device.

* * * * *

UNITED STATES PATENT AND TRADEMARK OFFICE
CERTIFICATE OF CORRECTION

PATENT NO. : 7,367,513 B2
APPLICATION NO. : 11/462632
DATED : May 6, 2008
INVENTOR(S) : Andrus It is certified that error appears in the above-identified patent and that said Letters Patent is hereby corrected as shown below:

Claim 8, line 4, please delete "ETDP" and insert --EDP-- therefore.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,367,513 B2 Page 1 of 1
APPLICATION NO. : 11/462632
DATED : May 6, 2008
INVENTOR(S) : Andrus It is certified that error appears in the above-identified patent and that said Letters Patent is hereby corrected as shown below:

Column 10, Claim 8, line 9, please delete "ETDP" and insert --EDP-- therefore.

This certificate supersedes the Certificate of Correction issued August 19, 2008.

Signed and Sealed this

Sixteenth Day of September, 2008

JON W. DUDAS
*Director of the United States Patent and Trademark Office*